Patented June 4, 1929.

1,715,795

UNITED STATES PATENT OFFICE.

HERMANN STAUDINGER, OF FREIBURG, GERMANY, AND THADEUS REICHSTEIN, OF ZURICH, SWITZERLAND, ASSIGNORS TO THE FIRM INTERNATIONALE NAHRUNGS- UND GENUSSMITTEL AKTIENGESELLSCHAFT, OF FRONWAGPLATZ, SCHAFF- HAUSEN.

METHOD OF PRODUCING MERCAPTANS OF THE FURFURYL SERIES.

No Drawing. Application filed July 22, 1927, Serial No. 207,814, and in Germany December 16, 1926.

In the U. S. Patent No. 1,696,419, dated December 25, 1928, the method of producing a synthetic aroma of coffee is described in which fugitive mercaptans, α-oxysulphides or disulphides derived from the mercaptans are employed. The present invention relates to the production of mercaptans of the furfuryl series, particularly to furfuryl mercaptans.

Furfuryl mercaptan and furfuryl disulphide may be produced from the readily available furfurol. Furfuryl-disulphide may be obtained from the aldehyde by a treatment with a sulphide compound of a strong base, such as sulphides or sulphydrates of the alkalis, earth alkalis or of the ammonia or of similar bases respectively. The conversion takes place in the most favorable manner in a diluted alcoholic solution, it may be carried out at low temperatures, but a heating of the component parts will promote the action. After the completed reaction furfuryl-disulphide may be isolated by an addition of water and by dissolving it in organic solvents and it may be purified by vacuum distillation. It is a colourless oil which has a boiling point of 112–115° C. at a pressure of 0.5 mm. mercury and which solidifies to crystals when cooled, which melt at a temperature of appr. 6° C. With alcoholic nitrate of silver crystalline double salt precipitates, which on being treated with dilute ammonia regenerates the original substance.

The mercaptan may be readily obtained from furfuryl-disulphide by reduction in an acid, neutral or alkaline solution. It may be isolated by distillation or by steam distillation respectively and produced in a pure state; it is a colourless oil having a boiling point of 45–47° C. at a pressure of 12 mm. mercury. It is insoluble in water, readily soluble in organic solvents, also in petroleum-ether and soluble in alkalis. With salts of heavy metals insoluble precipitations are formed (for instance silver-, lead-, zinc-mercapitides and so on). In its pure state or as concentrated solution it possesses a very disagreeable odour.

In order to produce furfuryl-mercaptan it is not necessary to isolate furfuryl-disulphide, but it is possible to obtain mercaptan from furfuryl in a single operation, by converting furfurol, for instance by means of ammonium-sulphohydrate or sodium-sulphohydrate into the disulphide and reducing the latter without isolating it to mercaptan.

Like furfuryl-mercaptans these other novel mercaptans have a very unpleasant odour in their undiluted state.

Example 1.

Furfuryl-disulphide is dissolved in ether and to the solution small quantities of water are gradually added and activated aluminium is admixed. After 3–4 hours the reduction is completed. The ether is removed by filtration and distillation and pure mercaptan is directly obtained in an almost quantitative yield.

Example 2.

Furfuryl-disulphide (1 mol) is dissolved in alcohol and sodium (appr. 2 atoms) are cautiously added; thereby the reduction of the disulphide is obtained with a slight resinification. Mercaptan is set free after driving off the alcohol by acidifying and is distilled with steam.

Example 3.

Furfurol together with an alcoholic solution of ammonium-sulphhydrate is left to stand in the cold for several hours or is heated in a water bath for ½–1 hour and is thereby converted into the disulphide compound; the latter is caused to precipitate by an addition of water and impurities are driven off by steam; after having been dissolved in ether furfuryl disulphide is reduced, without being subjected to any further purification process, for instance by an addition of activated aluminium.

Example 4.

Furfurol is dissolved in alcohol and after an addition of sodium-sulphide is saturated with sulphide of hydrogen, whereupon the conversion into disulphide takes place during heating; then amalgamated aluminium chips are added and the primarily built disulphide is reduced to mercaptan. The latter may be isolated by steam distillation.

We claim:

1. The herein described product consisting of furfuryl-mercaptan, the same being an oily colourless liquid having a boiling point of 45–47° C. at a pressure of 12 mm. mercury; it is insoluble in water, readily soluble in organic solvents, also in petroleum-ether and soluble in alkalis; with salts of heavy metals insoluble mercaptides are formed, its nitrobenzoic-acid-ester crystallizes out of benzin in yellow crystals having a melting point of 76–77° C.

2. The process of producing mercaptans of the furfuryl series, which consists in subjecting the respective disulphide to the action of reducing agents.

3. The process of producing mercaptans of the furfuryl series, which consists in converting the respective furfurol into the respective disulphide by reaction with an alkaline sulphurous compound, and subjecting the disulphide formed without isolating it to the action of a reducing agent.

4. The process of producing furfuryl-mercaptan, which consists in subjecting furfuryl-disulphide to the action of reducing agents.

5. The process of producing furfuryl-mercaptan, which consists in converting furfurol into furfuryl-disulphide by reaction with a soluble salt of hydrogen sulphide, and subjecting the furfuryl-disulphide formed, without isolating it, to a reduction.

6. The process of producing furfuryl-mercaptan, which consists in converting furfurol into furfuryl-disulphide by reaction with alkali-sulphhydrate, and subjecting the furfuryl-disulphide formed thereby, without isolating it, to the action of a reducing agent.

7. The process of producing furfuryl-mercaptan, which consists in converting furfurol into furfuryl-disulphide by reaction with ammonium-sulphhydrate, and subjecting the furfuryl-disulphide formed thereby, without isolating it, to the action of a reducing agent.

8. The process of producing furfuryl-mercaptan, which consists in converting furfurol into furfuryl-disulphide by reaction with alkali-sulphide, and subjecting the furfuryl-disulphide formed thereby, without isolating it, to the action of a reducing agent.

9. The process of producing furfuryl-mercaptan, which consists in converting furfurol into furfuryl-disulphide by reaction with ammonium sulphide, and subjecting the furfuryl-disulphide formed thereby, without isolating it, to the action of a reducing agent.

10. The step in the process of making a mercaptan of a furfuryl compound, which comprises reacting on a furfuryl compound other than a sulphur compound thereof with a sulphide compound of a strong base.

11. The process of making a mercaptan of a furfuryl compound, which comprises reacting on a furfuryl compound other than its sulphide, with a sulphide compound of a strong base, and reducing the resulting sulphide by a suitable reducing agent to mercaptan.

In testimony that we claim the foregoing as our invention, we have signed our names.

HERMANN STAUDINGER.
THADEUS REICHSTEIN.